US012717153B2

(12) United States Patent
Oberdörster et al.

(10) Patent No.: US 12,717,153 B2
(45) Date of Patent: Aug. 25, 2026

(54) MULTI-APERTURE PROJECTOR

(71) Applicant: Fraunhofer-Gesellschaft zur Förderung der angewandten Forschung e.V., Munich (DE)

(72) Inventors: Alexander Oberdörster, Jena (DE); Robert Brüning, Jena (DE); Christin Gassner, Jena (DE); Britta Satzer, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 293 days.

(21) Appl. No.: 18/469,337

(22) Filed: Sep. 18, 2023

(65) Prior Publication Data

US 2024/0004209 A1 Jan. 4, 2024

Related U.S. Application Data

(63) Continuation of application No. PCT/EP2022/057231, filed on Mar. 18, 2022.

(30) Foreign Application Priority Data

Mar. 19, 2021 (DE) ..................... 10 2021 202 716.4

(51) Int. Cl.
*H04N 9/31* (2006.01)
*G02B 27/09* (2006.01)
(Continued)

(52) U.S. Cl.
CPC ............. *G02B 27/18* (2013.01); *G02B 27/09* (2013.01); *G03B 21/2033* (2013.01)

(58) Field of Classification Search
CPC .... G03B 37/04; H04N 9/3147; G02B 27/126; G02B 27/1066; G02B 27/143
See application file for complete search history.

(56) References Cited

U.S. PATENT DOCUMENTS 5,300,966 A 4/1994 Telephon
2003/0156077 A1 * 8/2003 Balogh .................. G02B 30/27 345/6

(Continued)

FOREIGN PATENT DOCUMENTS

CN 103376626 A 10/2013
CN 108353115 A 7/2018

(Continued)

OTHER PUBLICATIONS

Jieyun Shen, "Office Action for Chinese Application No. 202280030019.3", dated May 14, 2026, CNIPA, China.

*Primary Examiner* — Ryan D Howard
(74) *Attorney, Agent, or Firm* — Bridgeway IP Law Group, PLLC; Jihun Kim

(57) ABSTRACT

A multi-aperture projector for projecting an optical image of a transmitted light image onto a spaced-apart projection surface has: at least one light source which, in an on state, causes at least one transmitted light image to project an optical image onto the projection surface; wherein the at least one transmitted light image is divided into a number of rectangular regions; a multi-aperture objective and a beam deflection element arrangement having a number of beam deflection elements for deflecting the light beams incident through the at least one transmitted light image, wherein the multi-aperture objective and the beam deflection arrangement form an arrangement of optical channels, wherein the beam deflection elements are arranged such that they are each tilted about a tilt axis.

18 Claims, 7 Drawing Sheets

(51) Int. Cl.

| | |
|---|---|
| ***G02B 27/18*** | (2006.01) |
| ***G03B 21/20*** | (2006.01) |

(56) References Cited

U.S. PATENT DOCUMENTS

| | | | | |
|---|---|---|---|---|
| 2013/0271844 | A1 | 10/2013 | Cheng et al. | |
| 2016/0065921 | A1 | 3/2016 | Sieler et al. | |
| 2017/0371150 | A1* | 12/2017 | Krause | F21V 14/08 |
| 2018/0176437 | A1 | 6/2018 | Forschung | |
| 2018/0284584 | A1* | 10/2018 | Itoh | G03B 21/208 |
| 2018/0324334 | A1 | 11/2018 | Forschung | |

FOREIGN PATENT DOCUMENTS

| | | | |
|---|---|---|---|
| CN | 108781249 | A | 11/2018 |
| DE | 10 2013 208 625 | A1 | 11/2014 |
| DE | 10 2020 107 072 | A1 | 9/2020 |
| EP | 0 519 774 | A1 | 12/1992 |
| WO | 99/29117 | A1 | 6/1999 |
| WO | 01/88598 | A2 | 11/2001 |
| WO | 2020/127748 | A1 | 6/2020 |

* cited by examiner

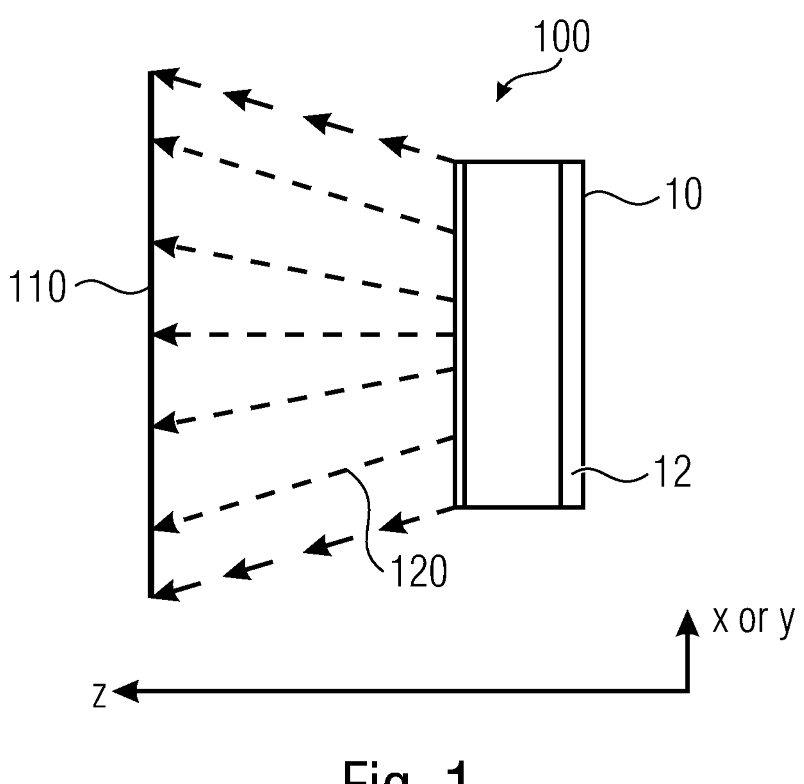
Fig. 1
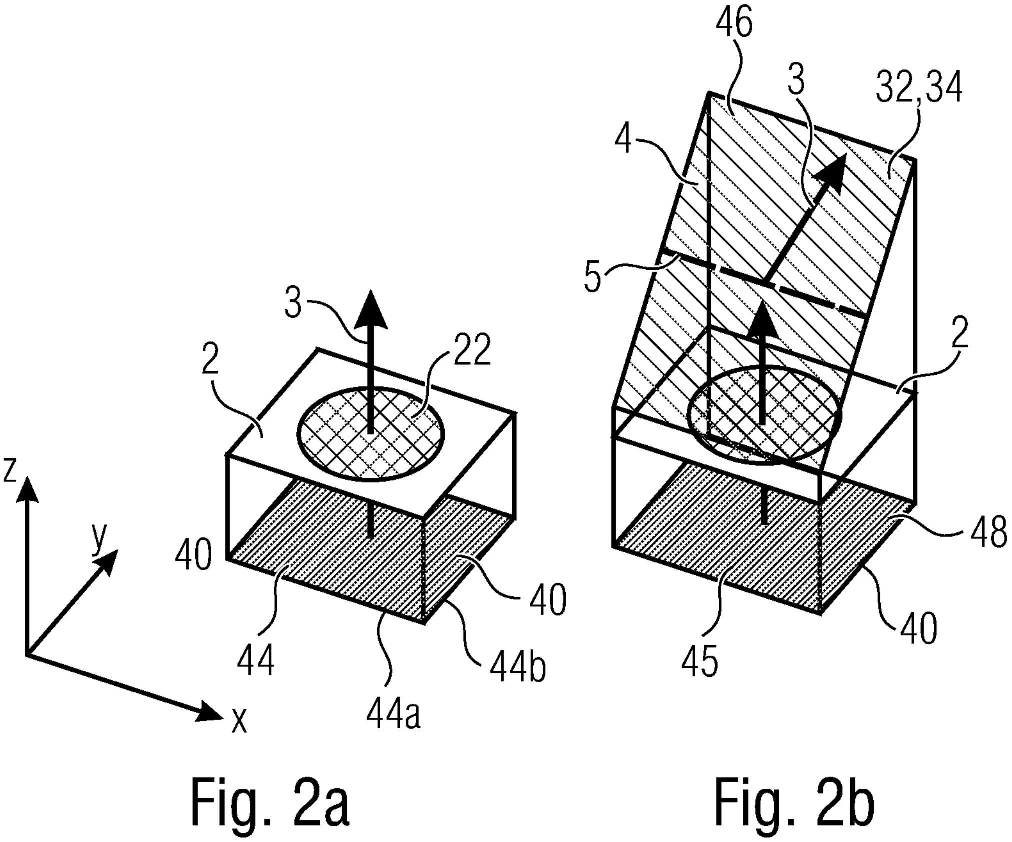
Fig. 2a
Fig. 2b

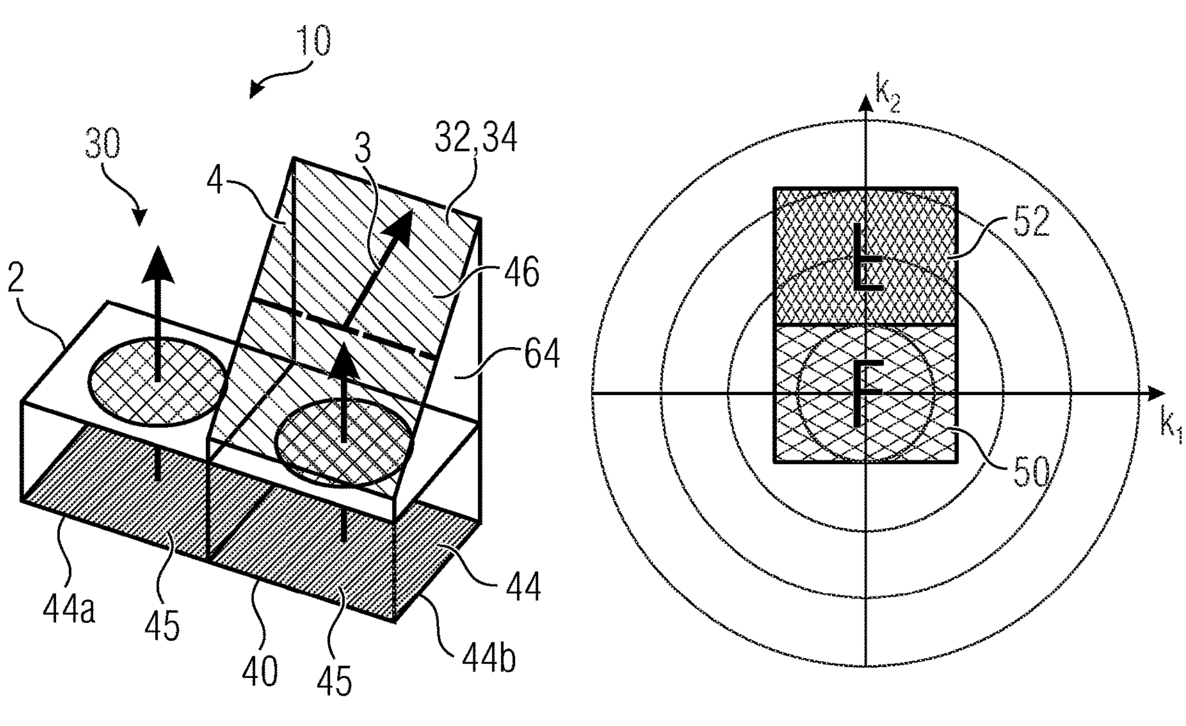
Fig. 3a
Fig. 3b
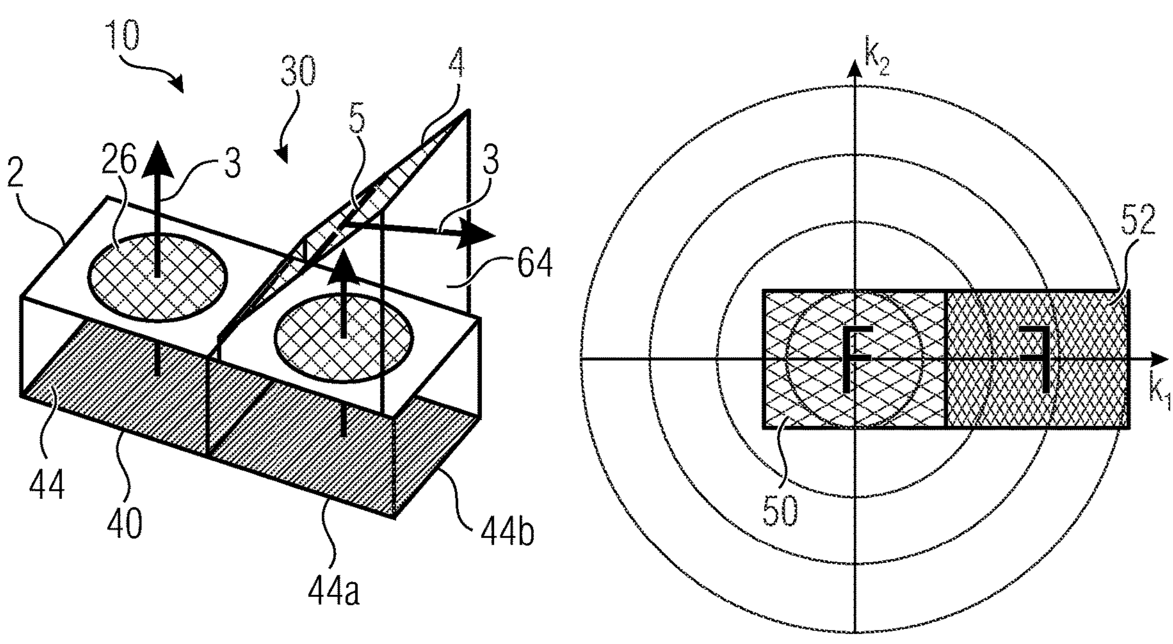
Fig. 3c
Fig. 3d

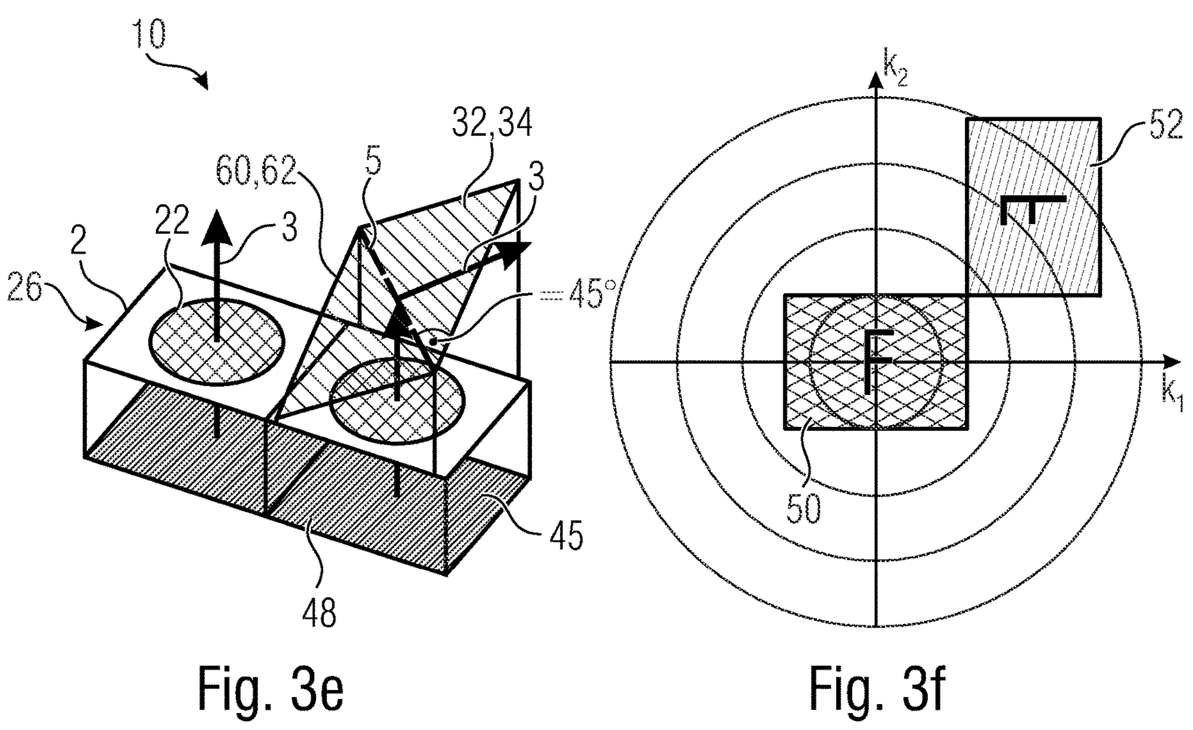
Fig. 3e
Fig. 3f
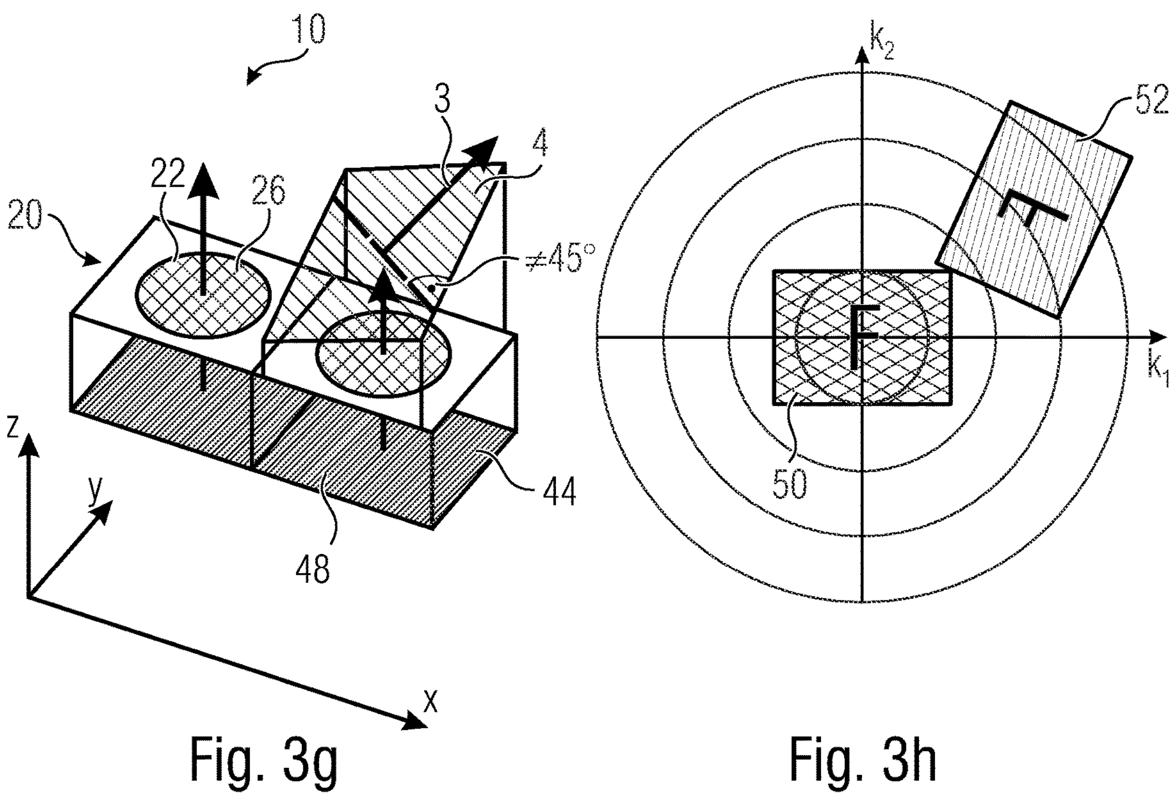
Fig. 3g
Fig. 3h

MULTI-APERTURE PROJECTOR

CROSS-REFERENCE TO RELATED APPLICATIONS

This application is a continuation of copending International Application No. PCT/EP2022/057231, filed Mar. 18, 2022, which is incorporated herein by reference in its entirety, and additionally claims priority from German Application No. 10 2021 202 716.4, filed Mar. 19, 2021, which is also incorporated herein by reference in its entirety.

TECHNICAL FIELD

The present invention relates to a multi-aperture projector for projecting an optical image of a transmitted light image from a relatively short distance onto a spaced-apart projection surface.

BACKGROUND OF THE INVENTION

If a large image is projected from a relatively short distance, i.e. at a small projection ratio, wide-angle projection optics are required. Such optics are complex and expensive with good imaging performance. In addition, the optics require a lot of installation space, which is to be avoided.

Alternatively, it is possible to compose the image to be projected from several optical channels, each of which projects a part of the image. In such solutions, there are channels which project "straight ahead". There are also channels whose optical axes are oblique relative to a channel surface. The optics of all these individual channels may consist of only a few optical elements since each optics element of a channel projects only a relatively small angular spectrum. An arrangement of several optical channels is more favorable in all and can be adapted more flexibly to the available installation space.

However, for particularly small projection ratios (i.e. a large image from a relatively short distance), such an arrangement of several optical channels, or projection channels, reaches its limits where the projection of an image can no longer be completely guaranteed. An incomplete projection of the image to be projected is caused because the optical axes of the edge channels would have to be particularly oblique at small projection ratios. With an optical axis which, relative to an objective surface or a channel surface of a central channel from the latter, extends at an angle of 45° into three-dimensional space, the imaging performance and/or the light intensity of the image to be projected are impeded. The optical axis is an imaginary line passing through the centers of the optical elements. The optical axis is an axis of symmetry in rotationally symmetric systems.

An object underlying the present invention is providing a multi-aperture projector for projecting an optical image of a transmitted light image from a relatively short distance onto a spaced-apart projection surface, wherein the multi-aperture projector is of compact and simple setup. In particular, an object underlying the present invention is providing a multi-aperture projector using which gaps or overlaps in the projected image of the image to be projected on the projection surface can be avoided.

SUMMARY

According to an embodiment, a multi-aperture projector for projecting an optical image of a transmitted light image onto a spaced-apart projection surface may have: at least one light source which, in an on state, causes at least one transmitted light image to project an optical image onto the projection surface; wherein the at least one transmitted light image is divided into a number of rectangular regions; a multi-aperture objective and a beam deflection element arrangement having a number of beam deflection elements for deflecting the light beams incident through the at least one transmitted light image, wherein the multi-aperture objective and the beam deflection arrangement form an arrangement of optical channels and are arranged relative to the at least one transmitted light image such that the light beams enter the optical channels after passing through the at least one transmitted light image so that after the light beams pass through the optical channels, projection of the optical image onto the projection surface takes place, wherein the number of beam deflection elements are arranged relative to each other and relative to the at least one transmitted light image such that each beam deflection element is tilted about a tilt axis, wherein the tilt axis passes through a beam deflection element surface and the tilt axis is in parallel to one side of a rectangular area or the tilt axis encloses a 45° angle with at least one side of two sides of the rectangular area.

Another embodiment may have a projection system having an inventive multi-aperture projector as mentioned above, and a projection surface for projecting an optical image of a transmitted light image onto the spaced-apart projection surface.

According to another embodiment, a multi-aperture projector for projecting an optical image of a transmitted light image onto a spaced-apart projection surface may have: at least one light source which, in an on state, causes at least one transmitted light image to project an optical image onto the projection surface; wherein the at least one transmitted light image is divided into a plurality of rectangular regions, each rectangular region of the transmitted light image forming a partial transmitted light image; a multi-aperture objective and a beam deflection element arrangement having a plurality of beam deflection elements for deflecting the light beams incident through the at least one transmitted light image, each beam deflection element pointing in a different direction and being associated with a partial transmitted light image, wherein the multi-aperture objective and the plurality of beam deflection elements form an arrangement of optical channels and are arranged relative to the at least one transmitted light image such that the light beams enter the optical channels after passing through the at least one transmitted light image so that after the light beams pass through the optical channels, the projection of the optical image onto the projection surface takes place, wherein the plurality of beam deflection elements are arranged relative to each other and relative to the at least one transmitted light image such that each beam deflection element is tilted about a tilt axis, wherein the tilt axis passes through a beam deflection element surface and the tilt axis is in parallel to one side of a rectangular area or the tilt axis encloses a 45° angle with at least one side of two sides of the rectangular area.

The core idea of the present invention is avoiding gaps and/or overlaps in the projected image on the projection surface. It has been recognized that there is an optimal arrangement of imaging elements with respect to the image to be projected, and with respect to the imaging elements relative to one another, in which the projected sub-images are ideally contiguous and linked to one another without significant overlap to form a large overall projected image.

In order to avoid gaps or overlaps in the projected image, it has been recognized that all mirror axes, which are also referred to as tilt axes herein, are to be selected such that they are in parallel with respect to an edge of a sub-image of the image to be projected. It is further advantageous for the tilt axes to be spaced parallel to the sub-image of the image to be projected.

The suggested multi-aperture projector for projecting an optical image of a transmitted light image, in particular from a relatively short distance, onto a spaced-apart projection surface comprises at least one light source which, in an on state, causes at least a transmitted light image to project an optical image onto the projection surface; wherein the at least one transmitted light image is divided into a number of rectangular regions, wherein in particular each rectangular region of the transmitted light image forms a partial transmitted light image. It is also conceivable for a plurality of transmitted light images to be projected. In such a case, one transmitted light image of the plurality of transmitted light images may be associated to a rectangular region of the entire transmitted light image formed from the plurality of transmitted light images. Provided the at least one light source is a separate component from the transmitted light image, the at least one light source, in an on state, projects light beams onto the at least one transmitted light image for projecting an optical image. Provided the at least one light source is included in the transmitted light image, in particular if the transmitted light image comprises a number of OLEDs and/or LEDs arranged in a matrix structure, the transmitted light image as such in an on state casts light beams directly onto optical channels for projecting an optical image The light source may emit white light or also narrow-band, i.e. colored, light. In particular, the light source may emit visible light, UV light, and/or IR light. Other light sources are also possible. There is no restriction on the light sources which can be used with the multi-aperture projector.

If, for example, a common transmitted light image or slide is used, it is essential that it is imaged completely and that the imaged image parts are joined together without gaps. If a deflection with mirrors for edge channels is used, this generally leads to the fact that the partial projections cannot be joined together without overlapping, but overlap.

To avoid this condition, the suggested multi-aperture projector comprises a multi-aperture objective and a beam deflection element arrangement comprising a number of beam deflection elements for deflecting the light beams incident through the at least one transmitted light image, wherein in particular each beam deflection element points to a different direction. Further, in particular, each beam deflection element is associated with a partial transmitted light image of the at least one transmitted light image. The beam deflection element arrangement has a plurality of beam deflection elements for deflecting incident light beams. A person skilled in the art understands that presently other electromagnetic beams, i.e. not only light beams of visible light, are also projectable using the suggested multi-aperture projector. Therefore, in the present context, light beams are understood to include electromagnetic beams of other wavelength ranges. The beam deflection elements may be represented by mirrors and/or prisms. In other words, a beam deflection element may be a mirror or a prism or a combination of mirror and prism.

The multi-aperture objective and the beam deflection arrangement, in particular the plurality of beam deflection elements, form an arrangement of optical channels and are arranged to the at least one transmitted light image such that the light beams are incident into the optical channels after passing through the at least one transmitted light image so that projection of the optical image onto the projection surface takes place after the light beams have passed through the optical channels. In the suggested multi-aperture projector, a single transmitted light image (slide) or a number of transmitted light images (slides) may be provided. In either case, the proposed multi-aperture projector has at least one transmitted light image (slide).

The plurality of beam deflection elements are arranged with respect to each other and with respect to the at least one transmitted light image such that each beam deflection element is tilted about a tilt axis, wherein the tilt axis passes through a beam deflection element surface and the tilt axis is parallel with one side of a rectangular region or the tilt axis encloses a 45° angle with at least one side of the two sides of the rectangular region.

At this point, it should be noted that a number means a natural number $n \geq 1$. Thus, a number also includes a plurality. A plurality is a natural number $n \geq 2$. The term number could be replaced by the term plurality, whereby only the case for $n=1$ would be omitted.

At this point, it should be noted that the tilt axles as used herein in the present application are only a conceptual aid to understanding or design, and are not necessarily, but may be, rotatable axles actually present in the finished assembly.

The tilt axis is in parallel to one side of the at least one rectangular region (option A) or the tilt axis encloses a 45° angle (option B) with at least one side of two sides of the at least one rectangular region, which in particular can be a partial area of the transmitted light image in the case of only one transmitted light image or, in the case of several transmitted light images arranged next to each other in a plane, one of these transmitted light images. If the condition of option A is fulfilled, the projected image does not rotate in the object space. The projected image is shifted and/or mirrored by a tilt at the tilt axis only in one direction, namely above, or below, or to one side of the image sensor surface in the object space. The corners of the desired overall projected image in the object space cannot be achieved by fulfilling option A. When the condition of option B is fulfilled, that is when the mirror axis or the tilt axis is at an angle of 45° (degrees) to at least one side of the at least one rectangular area of the transmitted light image, a rotation of the projected image in the object space by 90° (degrees) occurs. In addition, as with option A, a shift occurs. The sides of the rotated, in particular rectangular, projected image therefore are in parallel to the shifted sub-images or the shifted sub-image according to option A. Presently, it was recognized that if the tilt axis is at a different angle to the sides of the rectangular area, gaps or overlaps form in the projected sub-images. The present document describes how to obtain a complete projected image without gaps or overlaps from projected sub-images.

The proposed multi-aperture projector can thus be used to project a gapless image, i.e. the entire area of the transmitted light image can be projected completely onto the projection surface from a relatively short distance. For example, a transmitted light image with a size of 100 cm×50 cm at a distance of 15 cm can be projected onto a projection surface completely, in particular without gaps and without overlapping, using the suggested multi-aperture projector. The size of the projection surface itself can be as desired.

Preferably, the tilt axis is in parallel, in particular spaced, to the transmitted light image or to the surface of the transmitted light image or images. Due to the fact that the tilt axis on the one hand is in parallel to one side of the at least one rectangular area (option A fulfilled) or at a 45° angle to this side of the at least one rectangular area (option B fulfilled) and on the other hand is in parallel to the rectangular area, a two-dimensional tilt angle in a three-dimensional space is defined, which leads to a gapless projected image with a projection ratio <0.5.

The inventors of the present application have discovered that there is an optimal arrangement of the number of beam deflection elements, in which the partial projections ideally adjoin each other and complement each other without overlapping to form a large overall image. For this purpose, all mirror axes/tilt axes are selected such that they form an angle of 0°, 45° or 90° with each other or with the edges of the rectangular sub-images (the rectangular areas) on the slide. Furthermore, it can be of advantage if all mirror axes/tilt axes are selected such that they lie in the plane of the slide 40, i.e. in the slide surface.

Another aspect of the present invention relates to a projection system comprising the suggested multi-aperture projector and a projection surface.

The present invention addresses a problem that arises in very specific projection system arrangements. As used herein, the term projection system is to be understood as the suggested multi-aperture projector and a projection surface from which the image to be projected is projected. By means of the proposed multi-aperture projector, an image to be projected can be segmented into sub-images and these sub-images can be projected onto the projection surface through multiple optical channels, in such a way that a complete overall image is formed. The image to be projected is completely present in the projection system. The transmitted light image used in the multi-aperture projector is also called a slide. The transmitted light image or slide can be a transparent original on which the image to be projected is mapped and can be projected onto the projection surface by means of light beams. Segmentation in imaging is performed by having parts of this slide imaged by different optical channels.

The effect of the suggested multi-aperture projector or projection system is avoiding gaps or overlap when composing a large projected image from multiple sub-images. In a multi-channel system used in the suggested multi-aperture projector, the area of the slides/transmitted light image and the installation space is utilized more effectively, or the light used is utilized more effectively. The advantages are in detail: smaller waste of surface area of the slide/transmitted light image, which is particularly important, for example, with a controllable element such as a DLP (Digital Light Processing) or LCD. Further advantages are the smaller size, lighter weight and lower cost of the multi-aperture projector.

Projection systems or projectors are used in the following areas: projectors in vehicles, for example for the illumination of the exterior and interior, but also for informing the driver or other road users, robotics or machine vision, for example to simplify environment detection (illumination, pattern projection for 3D detection), mobile phones or other mobile consumer electronics devices and medical applications, for example also targeted disinfection by UV light.

BRIEF DESCRIPTION OF THE DRAWINGS

Embodiments of the present invention will be explained in detail below with reference to the accompanying drawings, in which:

FIG. 1 shows a schematic view of a projection system comprising a multi-aperture projector and a projection surface;

FIGS. 2*a, b* show schematic views of various examples of objectives and transmitted light images for forming optical channels with different viewing directions, namely straight ahead viewing direction (FIG. 2*a*) and side viewing direction (FIG. 2*b*), which may be incorporated in a multi-aperture projector as shown in FIG. 1;

FIGS. 3*a-h* show schematic views of multi-aperture projectors (FIGS. 3*a, c, e, g*) and illustration of the corresponding resulting projected image in object space (FIGS. 3*b, d, f, h*);

DETAILED DESCRIPTION OF THE INVENTION

Figures 4A, 4B:
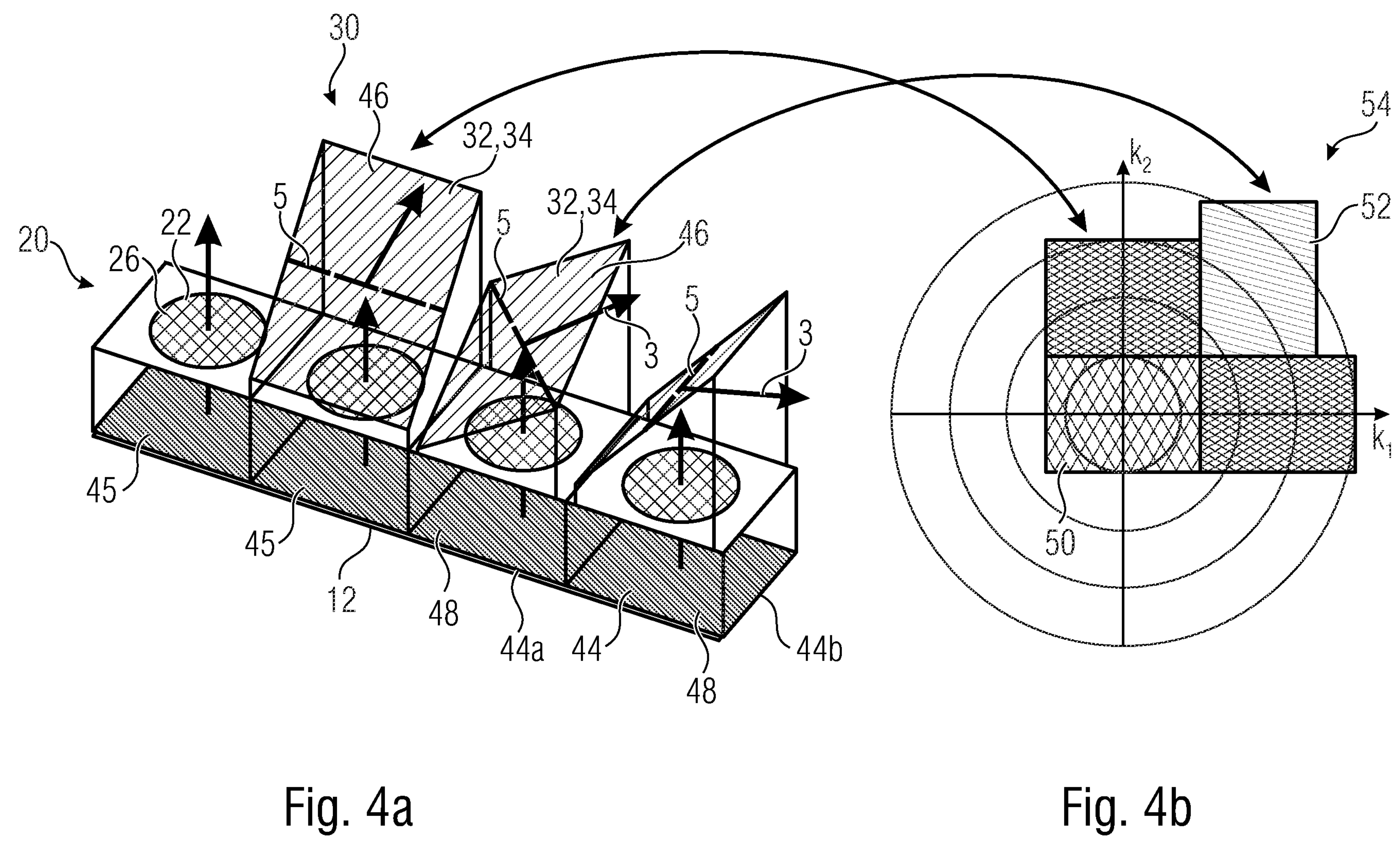
FIGS. 4*a-d* show schematic views of multi-aperture projectors (FIGS. 4*a, c*) and illustration of the associated resulting projected image in object space (FIGS. 4*b, d*)

Individual aspects of the invention described herein are described below in FIGS. 1 to 6*c*. An overview of FIGS. 1 to 6*c* illustrates the principle of the present invention. In the present application, equal reference numerals relate to equal elements or elements of equal effect, and not all reference numerals are illustrated again in all drawings if repetitive.

In FIGS. 1 to FIG. 5*b*, either a coordinate system in image space (x, y, z) or a coordinate system in object space ($k_1$, $k_2$) is indicated, which is referred to herein to further specify the suggested multi-aperture projector with respect to the indicated axes or the respective resulting projected image. The coordinates x, y, z, $k_1$, and $k_2$ are each real numbers, with the (x,y,z) coordinate system advantageously being Cartesian coordinates and the ($k_1$, $k_2$) coordinate system being polar coordinates.

FIG. 1 shows a schematic view of a projection system 100 comprising a multi-aperture projector 10 and a projection surface 110. Light beams 120 pass from the multi-aperture projector 10 to the projection surface 110, onto which the image to be projected of the transmitted light image of the multi-aperture projector 10 can be projected. The indicated coordinate system (x, y, z) shows an orientation of the multi-aperture projector 10 relative to a projection surface 110.

FIGS. 2*a* and 2*b* show schematic views of various examples of objectives 2 and transmitted light images 40 for forming optical channels 22 with different viewing directions 3. For example, FIG. 2*a* shows a rectangular transmitted light image 40 or slide 40 with an objective 2 arranged on or in parallel and spaced apart from the transmitted light image 40. The reference numeral 3 indicates a viewing direction 3 of the optical channel 22 in FIG. 2*a*. Without a beam deflection element 4, the viewing direction 3 of the optical channel 22 as shown in FIG. 2*a* extends along a straight-ahead direction or along a z-direction, while the associated transmitted light image 40 extends along an x-y plane as defined by an indicated coordinate system.

The slide 40 or the transmitted light image 40 in FIGS. 2*a* and 2*b* is rectangular with two different side lengths 44*a*, 44*b*. It is also conceivable to make the transmitted light image 40 or slide 40 squared. Exactly which angular area in the image space (x, y, z) a particular optical channel occupies can be determined by projecting its rectangular area on the slide 40 back into the object space through the objective 2 and the deflection element 4. The projected image 50, 52 in turn has the shape of a rectangle in the object space ($k_1$, $k_2$). See FIGS. 3 and 4. If this is carried out for different tilt angles of the beam deflection element 4, it is found that this rectangle performs a rotation under certain circumstances. However, this depends on the tilt angle in three-dimensional space in at least one plane. In other words, the rotation or displacement of the rectangle depends on the tilt axis 5 about which the beam deflection element 4 is tilted with respect to the image sensor 40. Two optical channels with different viewing directions 3 produce two projected sub-images r 50, 52 which are rotated and/or shifted with respect to each other.

In FIG. 2*b*, a beam deflection element 4 is arranged in front of the objective 2. The beam deflection element 4 can be, for example, a mirror 34 or a prism 32. It is further conceivable for the beam deflection element 4 to be a combination of mirror 34 and prism 32 or a combination of multiple mirrors 34 and prisms 32.

The various combinations of image sensor 40 and objective 2 and, if applicable, beam deflection element 4, as shown in FIGS. 2*a* and 2*b*, form building blocks of the suggested multi-aperture projector 10. The multi-aperture projector 10 includes at least one rectangular slide 40, a multi-aperture objective 20 for projecting an optical image, and a beam deflection element arrangement 30, as shown, for example, in FIGS. 2*a*, 3*a*, 3*c*, 3*e*, 3*g*, and 4*a*, and 4*c*.

While an optical channel 22 without mirror 34 or without prism 32 images straight ahead—more precisely perpendicularly away from the slide surface 45, i.e. along the z-direction—optical channels 22 with mirror 34 and/or prism 32 project sideways in the simplest case, i.e. in different directions along the slide plane, i.e. not in parallel to the z-direction. Other projection directions are possible in between depending on the position of the beam deflection element 4. Combining several optical channels 22 with and without beam deflection element 4 in this way, the projection system 100 can project a particularly large image from a short distance, i.e. has a very small projection ratio (significantly <1:1).

The transmitted light image 40 has a transmitted light image surface 45, which is rectangular or squared. The transmitted light image 40 in FIGS. 2*a* and 2*b* is rectangular with two different side lengths 44*a*, 44*b*. However, it is conceivable to make the transmitted light image 40 squared.

In the following, the adjective in the term "projected image" will be omitted and the term "image" will be used instead. It is clear to a person skilled in the art that we are talking about a projected image, which is projected by the multi-aperture projector. Furthermore, sub-image and image are used synonymously. A sub-image is always also an image. A complete image is composed of sub-images (images).

The sub-image 50 of the objective 2 looking straight ahead is shown as in FIGS. 3 and 4, for example, at the origin of the $k_1$-$k_2$ coordinate system. The lateral sub-image 52, which is shifted and/or rotated and/or mirrored by the respective associated beam deflection element 4, adjoins the straight-ahead sub-image 50 such that, in sum, a gapless overall image 54 can be created, as is shown, for example, in FIG. 5*a*.

In FIG. 2*b*, a beam deflection element 4 is arranged in front of the objective 2. The beam deflection element 4 can be, for example, a mirror 34 or a prism 32. It is further conceivable for the beam deflection element 4 to be a combination of mirror 34 and prism 32 or a combination of multiple mirrors 34 and prisms 32.

In FIG. 2*b*, the beam deflection element 4 has a geometry such that the beam deflection element 4 has a beam deflection element surface 46 on a side facing away from the transmitted light image surface 45 or the objective 2, which beam deflection element surface 46 extends away from the objective 2 at an angle α. The beam deflection element surface 46 extends along an optical axis 47. The optical axis 47 does not correspond to the tilt axis 5. The tilt axis 5 extends in the beam deflection element surface 46, while the optical axis 47 spans the beam deflection element surface 46 with another axis 47*a*. The tilt axis can thus span in parallel to the further axis 47*a* or perpendicular to the optical axis 47 or an angle of 45° with the optical axis 47.

In particular, the beam deflection element surface 46 may extend away from the objective 2 at an angle $\alpha>0°$ or $\alpha<90°$. In other words, the optical axis 47 extends away from the objective 2 at the angle $\alpha>0°$ or $\alpha<90°$. The beam deflection element surface 46 thus extends in three-dimensional space and has variable (x, y, z) coordinates starting from a surface of the objective 2, where x, y, and z are real numbers. The beam deflection element surface 46 has a tilt axis 5 which, as shown in FIG. 2*b*, is in parallel to the x-axis at a constant z-value and constant y-value, i.e. (x, y=constant, z=constant). Due to the geometry of the beam deflection element 4 or the tilt axis 5 of the beam deflection element 4, beam deflection takes place. In other words, the transmitted light image 40 or slide 40 with its optical channel 22 according to FIG. 2*b* has a viewing direction 3 deviating from the straight-ahead direction, namely laterally in the y-direction. One might say that the optical channel 22 with the slide 40 according to FIG. 2*b* looks laterally around the corner.

According to the suggestion, the multi-aperture projector 10 for projecting an optical image of a transmitted light image 40 from a relatively short distance onto a spaced-apart projection surface 110 therefore comprises at least one light source 12 which, in an on state, causes the at least one transmitted light image 40 to project an optical image onto the projection surface 110; wherein the at least one transmitted light image 40 is divided into a number of rectangular regions. Provided the at least one light source 12 is a separate component from the transmitted light image 40, the at least one light source 12, in an on state, projects light beams 120 onto the at least one transmitted light image 40 for projecting an optical image. Provided the at least one light source 12 is included in the transmitted light image 40, in particular if the transmitted light image 40 comprises a number of OLEDs and/or LEDs arranged in a matrix structure, the transmitted light image 40 as such in an on state casts light beams directly onto optical channels 22 for projecting an optical image. In any case, the at least one transmitted light image 40 is divided into a number of rectangular regions 44. The rectangular regions may have different side lengths 44*a*, 44*b*. The side lengths 44*a*, 44*b* may also be formed to have the same length such that the rectangular region 44 may be a squared region. Each rectangular region 44 of the transmitted light image 40 forms a partial transmitted light image. Further, it is possible that instead of one transmitted light image 40, several transmitted light images 40 are provided in the multi-aperture projector 10. The several transmitted light images 40 may be arranged in a plane side by side (i.e. along an x-y plane) and/or one behind the other (i.e. along a z-direction). Presently, the transmitted light image 40 may also refer to a plurality of transmitted light images 40. At least one transmitted light image 40 is meant by the transmitted light image 40.

The multi-aperture projector 10 further comprises a multi-aperture objective 20 and a beam deflection element arrangement 30 comprising a number of beam deflection elements 4 for deflecting the light beams 120 incident through the at least one transmitted light image 40. The multi-aperture projector 10 or components of the multi-aperture projector 10 are shown in FIGS. 1 to 6*c*. The multi-aperture objective 20 and the beam deflecting arrangement 30 form an arrangement of optical channels 22, which in particular point in different directions, and are arranged with respect to the at least one transmitted light image 40 such that the light beams 120 are incident into the optical channels 22 after passing through the at least one transmitted light image 40 so that after the light beams 120 have passed through the optical channels 22, the projection of the optical image onto the projection surface 110 takes place (see FIGS. 1 to 5).

The number of beam deflection elements 4 are arranged relative to each other and relative to the at least one transmitted light image 40 such that each beam deflection element 4 is tilted about a tilt axis 5, the tilt axis 5 passing through a beam deflection element surface 46 and the tilt axis 5 being in parallel to one side of a rectangular region 44 or the tilt axis 5 enclosing a 45° angle with at least one side of two sides of the rectangular region 44.

Preferably, the tilt axis 5 is in parallel, in particular spaced, to the at least one transmitted light image 40. Furthermore, advantageously, the tilt axis 5 is in parallel, in particular spaced, to the associated objective 2 of the respective optical channel 22. The tilt axis 5 thus is in an x-y plane, as can be seen, for example, in FIGS. 2*b* and 3*a* to 4*c*. A plane of the transmitted light image, herein also called slide surface 45 or transmitted light image surface 45, extends in the x-y plane. The tilt axis 5 thus is in parallel to the slide surface 45.

Preferably, the at least one transmitted light image 40 is exchangeable. The transmitted light image 40 can be implemented to be exchangeable or changeable so that different subjects can be projected with the same setup. In the suggested multi-aperture projector 10, different transmitted light images 40 may be used alternately, whereby the image to be projected is changeable. It is further conceivable for a plurality of transmitted light images 40 to be arranged in series, i.e. along a z-axis, in the multi-aperture projector 10. Furthermore, it is conceivable for a plurality of transmitted light images 40 to be arranged side by side in a plane, i.e. in an x-y plane, in the multi-aperture projector 10. For example, each optical channel 22 may then have its own transmitted light image associated therewith. A transmitted light image 40 may be a transparent template on which an image to be projected is imaged. The image to be projected may be carved into or printed on the template, or cut out of the template. The template may further be of different transparency in different colors. The template may be made of a transparent polymer or glass.

The at least one transmitted light image 40 is not controllable or changeable in current operation of the multi-aperture projector 10, particularly if the transmitted light image 40 comprises a transparent polymer or glass template. In other words, the transmitted light image 40 may be static. Preferably, the at least one transmitted light image 40 may be formed as an image on a substrate of different transparent materials, in particular transparent colored or clear glass or transparent colored or clear polymer.

It is also conceivable for the at least one transmitted light image 40 to be a controllable optoelectronic device 48. In particular, the transmitted light image may be a DMD device, where DMD is an abbreviation for Digital Micromirror Device. In technical jargon, a DMD is also known as a micromirror matrix. Furthermore, the controllable optoelectronic device may be a liquid crystal display (LCD). In particular, an LCD matrix can be operated in both transmission and reflection. The latter is also known as LCoS (Liquid Crystal on Silicon). Preferably, each optical channel 22 has then associated its own transmitted light image 40. The own transmitted light image 40 contains only the sub-image suitable for this optical channel 22. A complete projected image is then formed from the entirety of the slides 40/transmitted light images 40 in the projection. Especially in the case of controllable optoelectronic components 48 such as DMDs or LCDs, it may be advantageous to use a single slide 40 for the entire projection system 100.

In general, it is conceivable for the multi-aperture projector 10 to be controllable on a pixel-by-pixel basis, wherein the at least one transmitted light image 40 is formed as a light modulator. For example, the at least one transmitted light image 40 may be formed as an amplitude mask and/or a phase mask, or the at least one transmitted light image 40 may additionally comprise an amplitude mask and/or a phase mask. Consequently, the transmitted light image 40 may be or comprise an amplitude mask realized by light-absorbing substances of different densities deposited on a substrate. A coating of light-absorbing materials may be a polymer, but may also be a metallic coating, such as black chromium. The coating may also strongly absorb different wavelengths of light. For example, if the transmitted light image 40 is illuminated with visible light, this means that the transmitted light image 40 and thus the projection, i.e. the projected image, appear to be colored.

Further, advantageously, the at least one transmitted light image 40 is formed from a matrix of inorganic and/or organic LEDs. In other words, advantageously, the at least one transmitted light image 40 comprises the at least one light source 12 in the form of a matrix of inorganic and/or organic LEDs. The LEDs are light-emitting diodes, which in the broadest sense may also be referred to as self-luminous. This is because LEDs are light-emitting devices which are self-luminous, particularly when energized. If the transmitted light image 40 comprises OLEDs or LEDs, the transmitted light image 40 is self-luminous so that no further light source is required. In addition, a matrix of OLEDs and/or LEDs may be controllable on a pixel-by-pixel basis. For this purpose, a controller can be provided which drives the OLEDs and/or LEDs pixel by pixel. The LEDs/OLEDs as such can generate the image to be projected by driving the OLEDs/LEDs accordingly to emit light beams 120. A number of OLEDs and/or LEDs may be controllable per pixel. For example, these may be 640×480 or 1920×1080 LEDs/OLEDs. Thus, when the LEDs and/or OLEDs are turned on, the light beams 120 may be directed directly to an optical channel 22. It is also possible for the light beams of the LEDs/OLEDs to first impinge on another transmitted light image 40 and transmit and only then be directed to an optical channel.

Preferably, a transmitted light image 40 is associated to each optical channel 22. In particular, each optical channel 22 is associated its own transmitted light image 40. In this way, the number of optical channels 22 corresponds to the number of transmitted light images 40. If, for example, a panoramic image is to be projected, the entire panoramic image can be divided into partial transmitted light images and each partial transmitted light image can be associated its own optical channel 22. Here, an optical channel 22 is defined by an objective 2 with or without a beam deflection element 4.

Preferably, the beam deflection elements 4 are mirrors 34 and/or prisms 32. Accordingly, a beam deflection element 4 may be a mirror 34, or may be a prism 32, or may be a combination of mirror 34 and prism 32. Such mirrors 34 and/or prisms 32 are shown schematically in FIGS. 2 to 4.

Figure 6A:
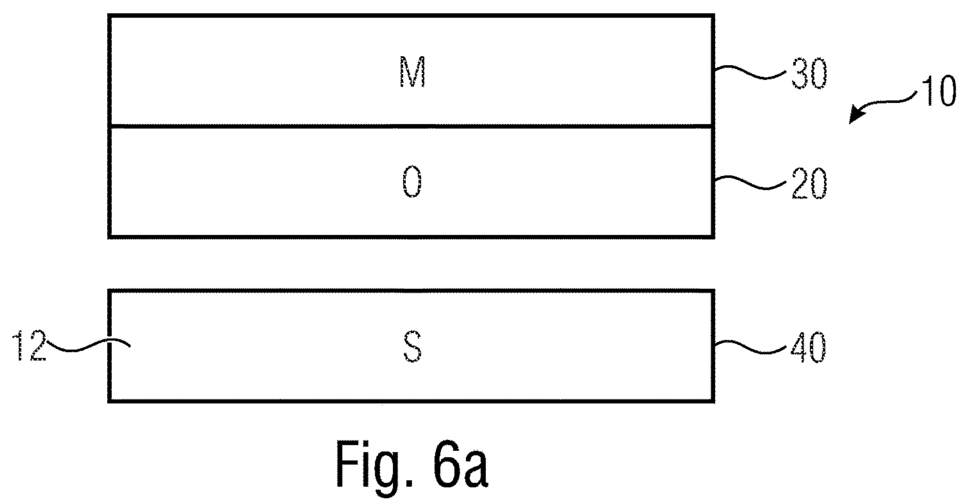
FIG. 6*a* shows a schematic multi-aperture projector in which the multi-aperture objective is positioned between the beam deflection element arrangement and at least one transmitted light image.
Figure 6B:
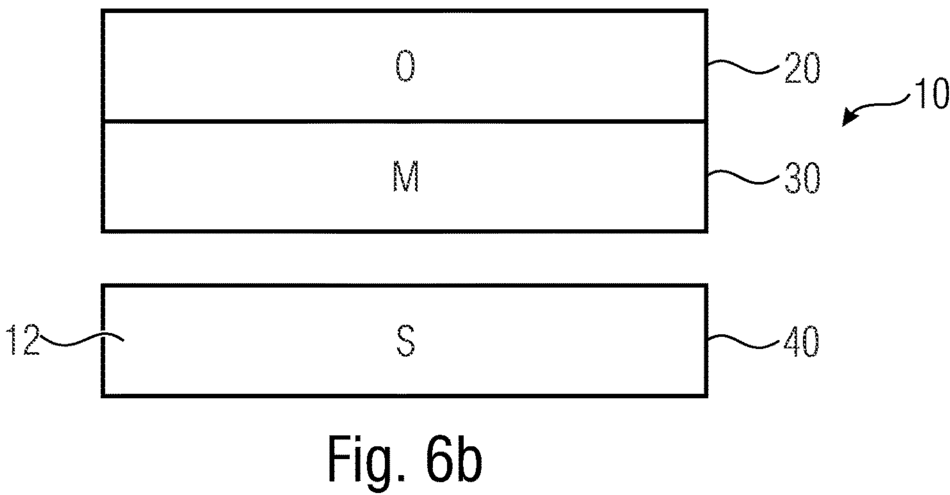
FIG. 6*b* shows a schematic multi-aperture projector in which the beam deflection element arrangement is disposed between the multi-aperture objective and the at least one transmitted light image.
Figure 6C:
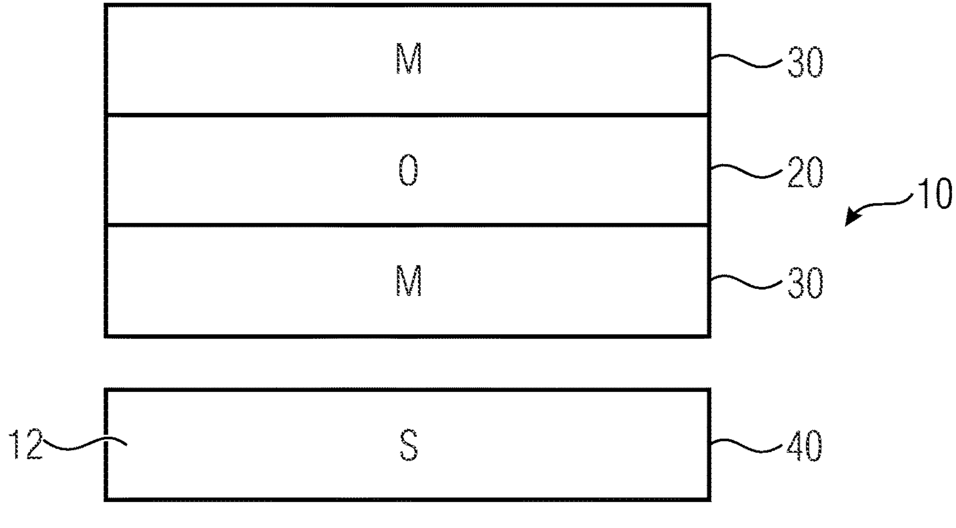
FIG. 6*c* shows a schematic multi-aperture projector in which the multi-aperture objective is surrounded on both sides by a beam deflection element arrangement each.

FIGS. 6*a*, 6*b* and 6*c* each show a schematic arrangement of a multi-aperture projector 10. FIG. 6*a* shows a multi-aperture projector 10 in which the multi-aperture objective 20 is arranged between the beam deflection element arrangement 30 and at least one transmitted light image 40. Preferably, the multi-aperture objective 20 and the beam deflector arrangement 30 are arranged relative to each other such that the multi-aperture objective 20 is located between the beam deflector arrangement 30 and the at least one transmitted light image 40.

FIG. 6*b* shows a multi-aperture projector 10 in which the beam deflection element arrangement 30 is disposed between the multi-aperture objective 20 and the at least one transmitted light image 40. FIG. 6*c* shows a multi-aperture projector 10 in which the multi-aperture objective 20 is surrounded on both sides by a respective beam deflection element arrangement 30. According to an embodiment, the multi-aperture projector 10 thus has two beam deflection arrangements 30, wherein the two beam deflection arrangements 30 surround the multi-aperture objective 20 on both sides, and wherein one of the two beam deflection arrangements 30 is attached to the at least one transmitted light image 40. This is shown schematically in FIG. 6*c*.

Preferably, the multi-aperture objective 20 is an objective arrangement formed by two or more objective 2. The objective 2 of the objective arrangement are arranged side by side, in particular each objective 2 has an optical channel 22 associated. The number of optical channels 22 is equal to the number of objectives 2. A partial area on the transmitted light image/slide is thus imaged by an associated objective 2. In other words, each objective 2 with its optical channel 22 captures the light beams 120 of a transmitted light image 40 associated only with the objective.

Preferably, at least one beam deflection element 4 has a metallic and/or a dielectric coating 60, 62. In particular, the metallic and/or dielectric coating 60, 62 is applied on a surface 64, such as on the beam deflection element surface, of the beam deflection element 4 to separate two adjacent optical channels 22 from each other and/or to allow reflections in the beam deflection element 4. Incoming electromagnetic beams or light beams are reflected or deflected at the metallic coating 60 or the dielectric coating 62 within the beam deflection element 4, according to the rule of angle of incidence equals angle of reflection.

Furthermore, beam deflection elements 4 without a coating are also conceivable. These can then, for example, exploit total internal reflection to deflect the electromagnetic beams. The beam deflection elements 4 can then be represented entirely or partially by prisms or by mirrors and prism-mirror combinations. Preferably, therefore, at least one beam deflection element 4 is configured to implement the beam deflection by means of total internal reflection. In general, it can be decided on a channel-by-channel basis how to bring about reflection. In other words, some beam deflection elements 4 may be coated, others may exploit total internal reflection, others may include at least one mirror and/or at least one prism.

Preferably, at least one optical component for collimating and/or homogenizing the light 120 is arranged between the at least one light source 12 and the at least one transmitted light image 40. Illumination of the slide 40 and/or the transmitted light image 40 may be provided by one or more light sources 12, i.e. by at least one light source. These light sources 12 may be LEDs and/or OLEDs, but incandescent lamps or low or high pressure gas discharge lamps or expanded laser radiation are also conceivable. The illumination may be at a single wavelength or at a spectrum of wavelengths. The at least one optical component for collimating and/or homogenizing the light helps that the image to be projected can be projected with a uniformly strong light cone, in particular with uniformly distributed light intensity. In particular, after collimation, the light beams 120 point in one direction, in particular in parallel and spaced apart. The one direction advantageously points to the projection surface 110.

Preferably, each beam deflection element 4 has associated an objective 2, but not each objective 2 has associated a beam deflection element 4 such that the number of beam deflection elements 4 is less than or equal to the number of objectives 2. In other words, the number of beam deflection elements 4 arranged side by side may be less than or equal to the number of objectives 2. For example, FIGS. 3 and 4 each show a schematic perspective of an extract of a multi-aperture projector 10. FIGS. 3*a* to 3*d* each show two objectives 2, arranged side by side in a 1×2 matrix structure, with only a single beam deflection element 4 arranged on one of the two objectives 2. This arrangement in the matrix structure simultaneously indicates a possible channel allocation, i.e. which part of the at least one transmitted light image 40 is projected through which optical channel 22. FIGS. 3 to 4 each also show a sub-image 50 resulting through the optical channel 22 of the associated objective 2 after projection in the object space.

In FIGS. 3 to 4, a coordinate system in object space is indicated, this coordinate system having the axes $k_1$ and $k_2$. The objective 2 without beam deflection element 4 looks in a straight-ahead direction, i.e. along an optical axis (in the z-direction) perpendicular to a slide surface 45, which is in parallel to an x-y plane. A straight-ahead optical channel 22 of an objective 2 does not require deflection or redirection of a light beam. The objective 2 with beam deflection element 4 has a lateral viewing direction. In other words, the objective 2 can look in a certain lateral direction by means of the beam deflection element 4.

Preferably, the tilt axis 5 is in parallel, in particular spaced, to the slide surface 45. In other words, the tilt axis 5 takes a constant value on the z-axis and extends either along the x-axis or along the y-axis in parallel to a side length 44*a*, 44*b* of the at least one transmitted light image 40 (see FIGS. 3*a* and 3*c*) or extends in the x-y plane such that the tilt axis 5 encloses an angle of 45° degrees with a side length 44 of the at least one image sensor 40 (see FIG. 3*e*). In FIG. 3*b*, the sub-images 50, 52 are indicated, which result from the objectives 2 shown in FIG. 3*a* with and without a deflection element 4. In the corresponding figures, the sub-image 50 is generated by the objective 2 looking straight ahead with an image sensor 40 and without a deflection element 4. The straight-ahead sub-image 50 is indicated in the origin of the object space ($k_1$, $k_2$).

Preferably, each beam deflection element 4 has a beam deflection element surface 46 which has the shape of a parallelogram or a trapezoid or a triangle or an oval or a circle or a polygon. It is further conceivable for the beam deflection element surface to have an asymmetric perimeter. It is conceivable to cut a mirror or prism to a desired shape, in particular for reasons of space. The beam deflection element 4 may also be part of the optical system of the objective, i.e. be optically effective. The optical channel 22 may then be a hybrid imaging system containing both refractive and reflective elements. In this case, the mirror may have any shape of reflective optical elements, for example parabolic, hyperbolic or spherical. It may also have another rotationally symmetric aspherical shape or have a free-form surface. Furthermore, a deflecting element 4 may have a segmented shape, i.e., it may be composed of several surfaces and may have kinks.

In FIG. 3, some positions of the beam deflection elements 4 and the resulting images 50, 52 in the object space are shown. Considering the position of a beam deflection element 4 as a result of tilting of the beam deflection element 4 about a tilt axis 5, it turns out that the tilt axis 5 is decisive for a rotation of the image or sub-image 52. More specifically, what is decisive is how the tilt axis 5 extends relative to the rectangular image sensor 40 or rectangular image sensor area associated with the optical channel 22.

The sub-images 52 result from an objective 2 with an image sensor 40 and a deflection element 4 looking in a lateral direction, as described above. For example, the sub-image 52 of FIG. 3*b* is mirrored upwards, i.e. mirrored along a $k_2$ axis and shifted along the $k_1$ axis. For example, the sub-image 52 of FIG. 3*d* is mirrored to the right to the side, i.e. mirrored along a $k_1$ axis and shifted along the $k_2$ axis. The tilt axes 5 in FIGS. 3*a* and 3*c* are each arranged in parallel to one side of the transmitted light image 40.

In FIGS. 3*a* and 3*c*, the tilt axis 5 of the beam deflection element 4 is in parallel to one of the sides of the slide 40. The associated sub-image 52 is mirrored upward (FIG. 3*b*) or mirrored to the right (FIG. 3*d*). An upward or rightward shift can be adjusted by an associated tilt angle.

In FIG. 3*e*, the tilt axis 5 of the beam deflection element 4 encloses an angle of 45° to the sides of the slide 40. The resulting sub-image 52 is mirrored about a 45° axis. In other words, the sub-image 52 is shifted to the upper left, which can be adjusted by the tilt angle (FIG. 3*f*).

In FIG. 3*g*, the tilt axis 5 of the beam deflection element 4 encloses an angle other than 45° to the sides of the slide 40. The resulting sub-image 52 is mirrored about an axis deviating from 45°, causing the sub-image to perform a rotation. This results in overlaps 70 and gaps 70 with other sub-images 52 (see also FIG. 5*b*).

The sub-image of FIG. 3*f*, for example, is rotated, mirrored and shifted in parallel to the axes in the object space so that the sub-image in FIG. 3*f* only connects to one corner of the sub-image 50 looking straight ahead, i.e. projected straight ahead. The tilt axis 5 in FIG. 3*e* is at a 45° angle to one side of the transmitted light image 40.

Figures 5A, 5B:
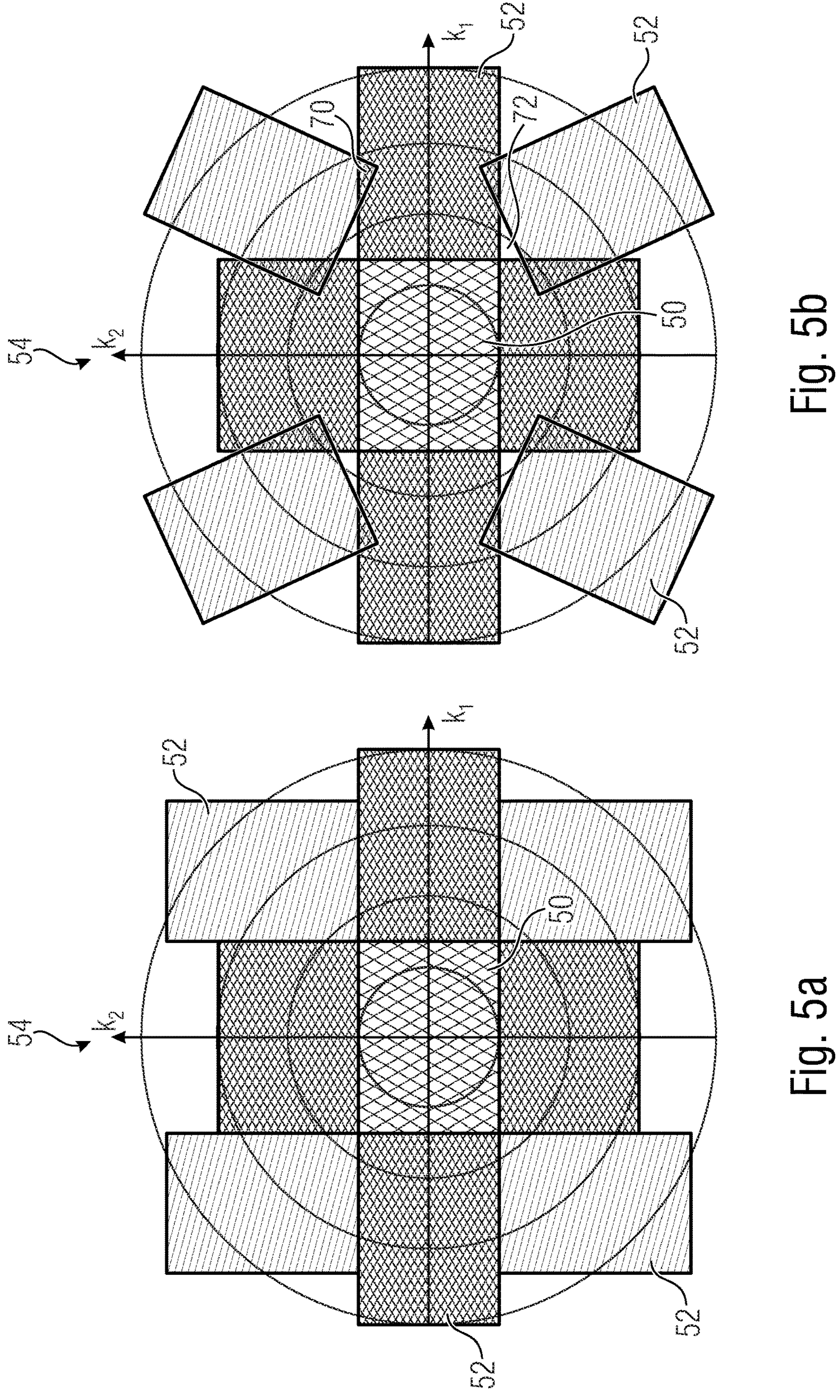
FIGS. 5*a, b* show schematic views of resulting projected sub-images in object space with nine optical channels each, where the optical channels in FIG. 5*a* exhibit no gaps and no overlap and the optical channels in FIG. 5*b* exhibit gaps and overlap.

The sub-image of FIG. 3*h* is, for example, rotated, mirrored and not shifted in parallel to the axes in the object space so that the sub-image in FIG. 3*h* results in gaps 72 and/or an overlap 70 with other sub-images 52 (cf. FIG. 5*b*). The tilt axis 5 in FIG. 3*g* is not at a 45° angle to one side of the transmitted light image 40.

Figures 4C, 4D:
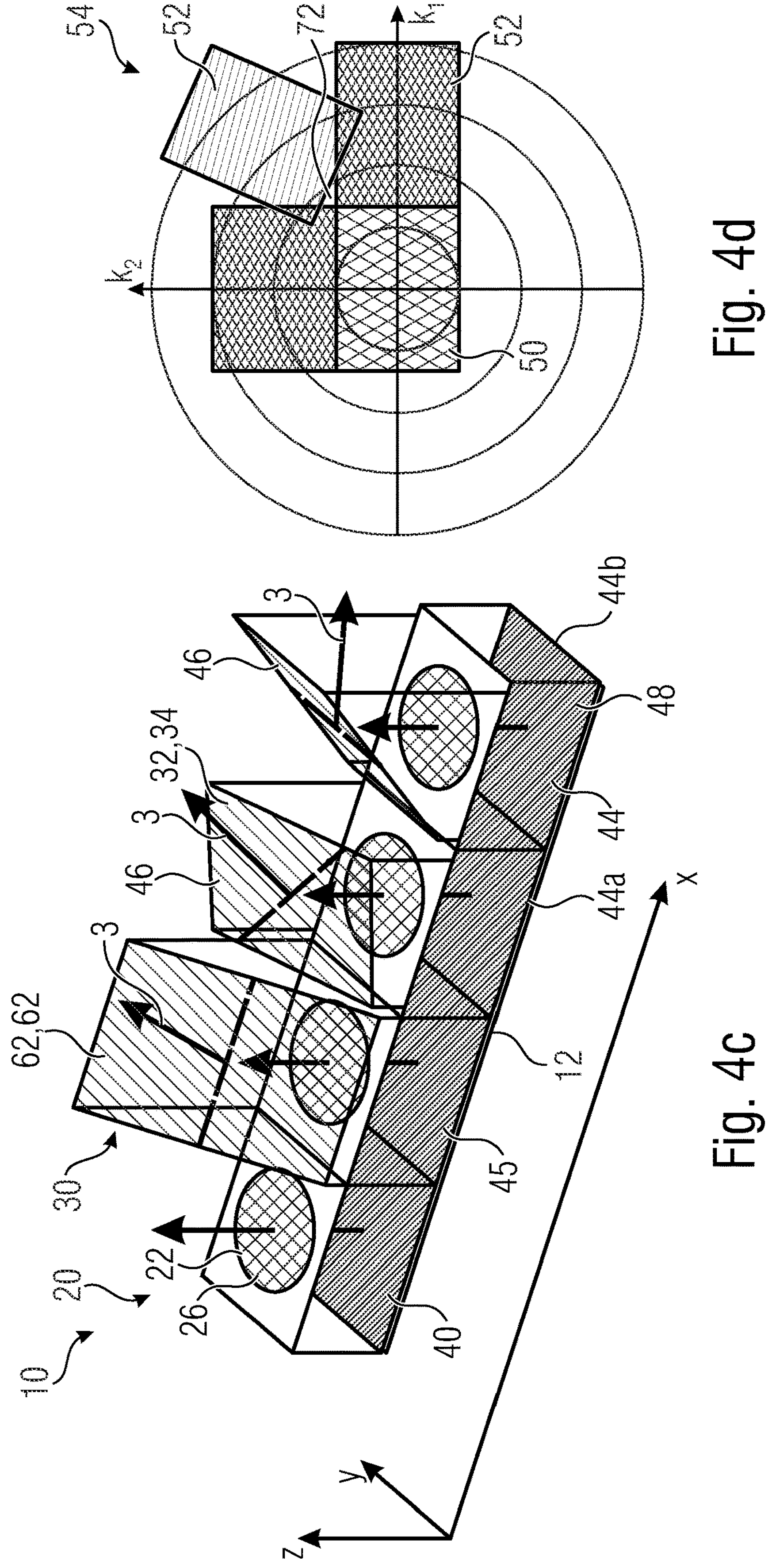

FIGS. 4*a* and 4*c* each show a multi-aperture projector 10 with four optical channels 22, and FIGS. 4*b* and 4*d* show the corresponding images 50, 52 in the object space. In FIG. 4*a*, the tilt axes 5 are either in parallel or enclose an angle of 45° to the sides of the slide 40. This results in a complete image without gaps (FIG. 4*b*). In FIG. 4*d*, the tilt axes 5 are either in parallel or do not enclose an angle of 45° to the sides of the image sensor 40. The result is an overall image with gaps 72 and overlaps 70 (FIG. 4*b*).

FIG. 5*a*, for example, shows a complete image 54 without gaps, which is composed of a straight-ahead sub-image 50 and eight surrounding sub-images 52. To create such a gapless overall image, a multi-aperture projector 10 as shown in FIG. 4*a* was used, for example, which was extended by five additional optical channels 22. The optical channels of FIG. 5*a* are arranged in a 3×3 matrix structure, for example. The optical channels may generally be arranged in an m×n matrix structure, where m and n are natural numbers.

FIG. 5*b* shows an overall image with gaps 72 and overlaps 72. To create such an overall image with gaps 72 and overlaps 70, for example, a multi-aperture projector 10 as shown in FIG. 4*c* was used, which has a tilt axis 5 that is neither in parallel nor at a 45° angle to the sides 44 of the image sensor 40.

If the objectives 2, which form an objective array, are mounted between the transmitted light image 40 and the beam deflection element arrangement 30, which may be, for example, a prism array and or a mirror array, the objective array may be particularly compact.

Preferably, the objective arrangement is implemented to be monolithic. Monolithic in this context means consisting of one piece or one-piece. Preferably, the lenses 26 of the objectives 2 are arranged side by side on a common glass wafer (not shown). In other words, the lenses 24 are advantageously arranged in one plane. The glass wafer thus acts as a support or substrate, which may be referred to as wafer-level optics. The objectives may also each comprise a plurality of lenses; then, for example, the objective arrangement comprises a plurality of stacked glass wafers.

Preferably, each objective 24 of the multi-aperture objective 20 has associated a plurality of pixels of the at least one transmitted light image. In other words, the objectives 2 shown in FIGS. 2 to 4 are each coupled, in particular connected, to a transmitted light image 40 such that an optical channel 22 of an objective 24 leads to a number of pixels of the transmitted light image 40. If the transmitted light image 40 has pixels, the transmitted light image is advantageously a controllable transmitted light image 40.

Preferably, the multi-aperture projector has several, in particular four, six, nine or fifteen, optical channels. In particular, the number of objectives 2 dictates the number of optical channels 22. In FIG. 4, for example, four optical channels 22 can be seen. The optical channels are advantageously arranged in matrix form. In FIG. 4, four channels are arranged in a 1×4 matrix structure. Accordingly, the objectives 2 or the transmitted light image or images 40 are arranged in a matrix structure.

Although some aspects have been described in connection with an apparatus, it is understood that these aspects also constitute a description of a corresponding method so that a block or component of an apparatus is also to be understood as a corresponding method step or a feature of a method step. A presentation of the present invention in terms of method steps is omitted herein for reasons of redundancy. Some or all of the method steps could be performed by (or using) a hardware apparatus, such as a microprocessor, a programmable computer, or an electronic circuit. In some embodiments, some or more of the most important method steps may be performed by such an apparatus. In particular, this is the case when a focusing mechanism and/or an image sensor are operated or even interact with each other.

In the preceding detailed description, various features may have been grouped together in examples to streamline the disclosure. This type of disclosure should not be interpreted as an intent that the claimed examples comprise more features than are expressly cited in each claim. Rather, as the following claims reflect, the subject-matter may be found in fewer than all of the features of a single disclosed example. Consequently, the following claims are hereby incorporated into the detailed description, and each claim may stand as its own separate example. While each claim may stand as its own separate example, it is to be noted that although dependent claims in the claims refer back to a specific combination with one or more other claims, other examples also include a combination of dependent claims with the subject-matter of any other dependent claim or a combination of any feature with other dependent or independent claims. Such combinations are said to be included unless it is stated that a specific combination is not intended. Furthermore, a combination of features of a claim with any other independent claim is intended to be also included, even if that claim is not directly dependent on the independent claim.

Depending on particular implementation requirements, embodiments of the invention may be implemented in hardware or in software, or at least partially in hardware or at least partially in software. The implementation may be performed using a digital storage medium, for example, a floppy disk, a DVD, a BluRay disc, a CD, ROM, PROM, EPROM, EEPROM, or a FLASH memory, a hard disk, or any other magnetic or optical storage medium on which electronically readable control signals are stored, which may or do cooperate with a programmable computer system such as to perform the respective method. Therefore, the digital storage medium executing the proposed teaching may be computer-readable.

Thus, some embodiments according to the teachings described herein include a data carrier having electronically readable control signals capable of interacting with a programmable computer system such that one of the features described herein is performed as a method.

Generally, embodiments of the teachings described herein may be implemented as a computer program product having program code, wherein the program code is operative to perform any of the methods when the computer program product runs on a computer.

For example, the program code may also be stored on a machine-readable carrier.

Other embodiments comprise the computer program for performing any of the features described herein as a method, wherein the computer program is stored on a machine-readable carrier. In other words, an embodiment of the method according to the invention is thus a computer program comprising program code for performing any of the methods described herein when the computer program runs on a computer.

Thus, another embodiment of a suggested method is a data carrier (or digital storage medium or computer-readable medium) on which is recorded the computer program for performing any of the features described herein as a method. The data carrier or digital storage medium or computer-readable medium is typically tangible and/or non-volatile.

Thus, another embodiment of the suggested method is a data stream or sequence of signals representing the computer program for performing any of the methods described herein. For example, the data stream or sequence of signals may be configured to be transferred over a data communication link, such as over the Internet.

Another embodiment comprises a processing device, such as a computer or programmable logic device, configured or adapted to perform a method to the system described herein.

Another embodiment includes a computer on which is installed the computer program for performing the method to the system described herein.

Another embodiment according to the invention comprises an apparatus or system configured to transmit a computer program for performing at least one of the features described herein in the form of a method to a receiver. The transmission may be, for example, electronic or optical. The receiver may be, for example, a computer, mobile device, storage device, or similar device. The apparatus or system may include, for example, a file server for transmitting the computer program to the receiver.

In some embodiments, a programmable logic device (for example, a field programmable gate array, FPGA) may be used to perform some or all of the functionality of the methods and apparatus described herein. In some embodiments, a field programmable gate array may cooperate with a microprocessor to perform the method described herein. Generally, in some embodiments, the method is performed on the part of any hardware device. This may be general-purpose hardware, such as a computer processor (CPU), or hardware specific to the method, such as an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A multi-aperture projector for projecting an optical image of a transmitted light image onto a spaced-apart projection surface, comprising:

at least one light source which, in an on state, causes at least one transmitted light image to project an optical image onto the spaced-apart projection surface; wherein the at least one transmitted light image is divided into a plurality of rectangular regions, each rectangular region of the at least one transmitted light image forming a partial transmitted light image; and a multi-aperture objective, which is formed from several lenses, and a beam deflection element arrangement comprising a plurality of beam deflection elements for deflecting light beams incident through the at least one transmitted light image, each beam deflection element pointing in a different direction and being associated with a partial transmitted light image, wherein the multi-aperture objective and the plurality of beam deflection elements form an arrangement of optical channels and are arranged relative to the at least one transmitted light image such that the light beams enter the optical channels after passing through the at least one transmitted light image so that after the light beams pass through the optical channels, a projection of the optical image onto the spaced-apart projection surface takes place, wherein an optical channel is defined by a lens with or without a beam deflection element, wherein each optical channel is assigned a respective transmitted light image, wherein the optical channel without the beam deflection element images straight ahead, resulting in a projected straight-ahead partial transmitted light image, wherein the plurality of beam deflection elements is arranged relative to each other and relative to the at least one transmitted light image such that the each beam deflection element is tilted about a tilt axis, wherein the tilt axis passes through a beam deflection element surface and the tilt axis is in parallel to one side of a rectangular area or the tilt axis encloses a 45° angle with at least one side of two sides of the rectangular area, in order to obtain a seamless, overlap-free projected overall image from projected partial transmitted image, and wherein the projected partial transmitted image shifted, rotated and/or mirrored by a respective associated beam deflection element is adjacent to a straight-ahead partial transmitted light image in such a way that, in total, a gap-free overall image is produced.

2. The multi-aperture projector according to claim 1, wherein the tilt axis is in parallel to the at least one transmitted light image.

3. The multi-aperture projector according to claim 1, wherein the at least one transmitted light image is not controllable or changeable in current operation of the multi-aperture projector.

4. The multi-aperture projector according to claim 1, wherein the at least one transmitted light image is a controllable optoelectronic device.

5. The multi-aperture projector according to claim 1, wherein the at least one transmitted light image comprises the at least one light source in a form of a matrix made of inorganic and/or organic LEDs.

6. The multi-aperture projector according to claim 1, wherein each optical channel is associated with a transmitted light image.

7. The multi-aperture projector according to claim 1, wherein the at least one transmitted light image is formed as an image on a substrate made of different transparent materials.

8. The multi-aperture projector according to claim 1, wherein the plurality of beam deflection elements are mirrors and/or prisms.

9. The multi-aperture projector according to claim 1, wherein the multi-aperture objective is disposed between the at least one transmitted light image and the beam deflection element arrangement, or the beam deflection element arrangement is arranged between the at least one transmitted light image and the multi-aperture objective.

10. The multi-aperture projector according to claim 1, wherein the at least one transmitted light image is formed as an amplitude mask and/or a phase mask or additionally comprises an amplitude mask or a phase mask.

11. The multi-aperture projector according to claim 1, wherein the multi-aperture objective is an objective arrangement formed by two or more objectives, wherein the two or more objectives are arranged side by side in the objective arrangement, wherein an optical channel is associated with each objective.

12. The multi-aperture projector according to claim 1, wherein at least one beam deflection element comprises a metallic and/or a dielectric coating.

13. The multi-aperture projector according to claim 1, wherein at least one optical component for collimating and/or homogenizing light is disposed between the at least one light source and the at least one transmitted light image.

14. The multi-aperture projector according to claim 1, wherein an objective is associated with each beam deflection element, wherein the beam deflection element is not associated with each objective such that a number of the plurality of beam deflection elements is less than a number of objectives.

15. The multi-aperture projector according to claim 11, wherein the objective arrangement is formed to be monolithic, or wherein lenses of the two or more objectives are arranged side-by-side on a common glass wafer.

16. The multi-aperture projector according to claim 1, wherein the multi-aperture objective and the beam deflection element arrangement are arranged relative to each other such that the multi-aperture objective is located between the beam deflection element arrangement and the at least one transmitted light image.

17. The multi-aperture projector according to claim 1, wherein the beam deflection element arrangement is disposed on the multi-aperture objective such that the beam deflection element arrangement is located between the multi-aperture objective and the at least one transmitted light image.

18. A projection system comprising the multi-aperture projector according to claim 1 and a projection surface for projecting the optical image of the at least one transmitted light image onto the projection surface.

* * * * *